Aug. 26, 1969 F. J. HODGE ET AL 3,463,874

DROPOUT COMPENSATOR FOR NTSC COLOR TELEVISION

Filed May 25, 1966 3 Sheets-Sheet 1

INVENTORS:
Frederick J. Hodge
Ralph R. Barclay

By Smyth, Roston & Pavitt

ATTORNEYS

INVENTORS:
Frederick J. Hodge
Ralph R. Barclay

By Smyth, Roston & Pavitt
ATTORNEYS

DROPOUT COMPENSATOR FOR NTSC COLOR TELEVISION

Filed May 25, 1966 3 Sheets-Sheet 3

INVENTORS:
Frederick J. Hodge
Ralph R. Barclay
By Smyth, Roston & Pavitt
ATTORNEYS United States Patent Office 3,463,874

Patented Aug. 26, 1969

3,463,874

DROPOUT COMPENSATOR FOR NTSC COLOR TELEVISION

Frederick J. Hodge and Ralph R. Barclay, Camarillo, Calif., assignors to Minnesota Mining and Manufacturing Company, St. Paul, Minn., a corporation of Delaware Filed May 25, 1966, Ser. No. 552,779

Int. Cl. H04n *1/46, 9/02*

U.S. Cl. 178—5.2 14 Claims

ABSTRACT OF THE DISCLOSURE

The present invention is directed to a dropout compensator for the NTSC color television system which compensates for dropouts in color video signals with a high degree of accuracy. Both luminance and color information are delayed for a period of substantially one line of video information wherein the color video signal is subdivided into two channels, one representing the luminance information and the other representing the color information. The color information is phase reversed so as to provide for a proper phase relationship of the color information and the two channels are recombined to provide a compensating signal which is substituted for the original color video signal when a dropout occurs.

This invention relates to a dropout compensator. In particular, the present invention relates to a dropout compensator which may be used to provide compensation for dropouts in the reproduction of color television signals.

In the prior art, dropout compensators have been used to provide information to replace information which is missing from a video signal. For example, the information may be missing after the video signal has been recorded and reproduced from a magnetic tape. The missing information is designated as a dropout and the dropout may occur due to imperfections in the tape used for the video recording and reproduction or due to the subsidiary equipment used in the video tape recorder. When the dropout in the video signal occurs, it causes a disturbance in the video signal which appears usually in the form of random black and white streaks or flashes on the screen of the television receiver.

It has been determined that the information present on the screen of a television receiver is largely redundant from line to line. The dropout compensators of the prior art have operated on the principle that since the information is largely redundant from line to line, it is possible to compensate for a dropout by substituting information from a previous line. The dropout compensators of the prior art, therefore, store information from a previous line and insert the stored information into the video signal when a dropout occurs.

The dropout compensators of the prior art have operated very successfully on black and white video signals and the same black and white dropout compensators have also been used to provide some compensation for dropouts in a color video signal. The prior art dropout compensators have operated by monitoring information being reproduced from a magnetic tape, and when a dropout is detected a switch is controlled to supply the information from a previous line. When there is no dropout present in the video signal, which is the normal situation, the switch is controlled to pass information directly from the magnetic tape.

With the prior art dropout compensators, which have been used for both black and white and color information, the dropout compensator provides only a luminance correction for the color compensation. The use of the luminance portion of the color video signal to provide compensation for the color signal is adequate when the color signal is designed to provide a good black and white display. The prior art color signals have depended largely upon the quality of the luminance information because the prior art color receivers had not been able to provide a very vivid color display. The eye, therefore, would tolerate the substitution of luminance information alone without any substitution of color information as an adequate means of dropout compensation.

The new color receivers are capable of producing more vivid colors. Television broadcasters now concentrate on the quality of the color picture and place a lesser importance on the compatibility of the black and white dislay. The use of luminance information alone for the dropout compensation may, therefore, cause problems in the compensation of some color signals.

For example, when the color information has high saturation, the use of luminance information alone does not provide sufficient dropout compensation. The subcarrier information, for instance, may affect the luminance information if there are non-linearities in the display system. When this occurs, the dropout substitution material which replaces only redundant luminance information appears black or may appear to be inserting darker and slightly off-color information due to the kinescope tracking and system linearity.

An additional problem occurs when a saturated color appears with reduced or no luminance information at or near the primary colors. At these times, the use of redundant luminance information as dropout compensation appears to be completely black on the television screen. Another problem occurs when the convergence is considerably less than perfect, which is not unusual, near the edges of the television raster. At these times, successive scan lines may contain entirely different color capabilities. A dropout replacement using luminance information only has the same problem as edge information in the picture since it represents a color discontinuity. The wrong color or apparent wrong intensity replacement of the dropout may therefore result.

As can be seen from above, use of luminance information alone does not provide an adequate dropout compensation under the new color programming techniques. It would, therefore, be desirable to have a full-color replacement signal for the dropout compensation. Although the use of a full-color dropout compensation is the desired result, this type of compensation is difficult to achieve because of the required accuracy of the information. It has been determined that even a slight color hue error in the substitute information is more objectionable than any of the above-mentioned errors due to the use of luminance information. No color substitution at all but correct luminance is superior to the use of a wrong color, especially in regions of complementary color.

In order to obtain accurate color replacement information, it is necessary to overcome certain basic problems. First, the time base stability of the dropout compensator must be held to about 3 nanoseconds. Second, the differential phase and gain of the information must be carefully controlled. Third, we must overcome the problem of dot interlace of the 3.58-megacycle chroma subcarrier information.

The time base problem is aggravated by the substitution information being delayed one line for storage before it is used to provide dropout compensation. The storage of the substitution information destroys its phase coherence with the color burst signal for the particular line of color information and, in addition, imposes a stringent time delay accuracy requirement. The differential phase and gain problem is aggravated by the envelope delay performance limitations of storage devices for the one-line delay required for the substitute information.

Finally, the dot interlace is aggrevated due to the design of the color system itself. The synchronizing signal for the NTSC 525 line color system is caused to be $\frac{2}{455}$ of the color subcarrier frequency. The above frequency then determines the scan frequency which must be precisely periodic in the color system. The color subcarrier is thus caused to interlace so that at the same point in time on successive lines the color phase appears to be inverted. When we store exactly one line of information, the inversion of the color phase does not take place since in the delay line the periodic nature of the color carrier is frozen for the delay period and the output signal is an exact replica of the input signal. This exact replica signal is actually the wrong color phase for the next line of color information.

When a dropout occurs and the exact replica signal is used, and is subject to the time element compensation equipment used in all direct color recovery, the timing signal from the sync pulse is in apparent conflict with the timing signal from the color burst. When the delay of the dropout compensator is set for the sync pulse, the color phase is shifted 180° for any dropout replacement in the line. When the delay of the dropout compensator is set for correct phase of the color information, a dropout in the sync causes a color disturbance to the entire remaining normal line which is not subject to the dropout. It is, therefore, necessary to provide a color signal for dropout compensation which has the proper phase relationship to the normal line of information.

The present invention provides a proper delayed signal for use as a color dropout compensation signal which has the proper phase relationship to the normal line of information. The present invention accomplishes the above by delaying the color video signal for a period of time equal to one television line and by phase inverting the color portion of the color video signal. The present invention provides the color dropout compensating signal using a 2-channel delay system. The first channel is arranged to pass the luminance information and the second channel is arranged to pass the color information. The second channel includes means to phase invert the color information so that the output of the second channel provides the proper phase relation. The outputs from the two channels are added so as to provide a proper color dropout signal for a color video signal.

The present invention also incorporates the use of glass delay lines which have very high temperature stability. The input information supplied to a glass delay line may be modulated so that the glass delay line is operated within a desirable frequency range and the output information from the glass delay line is then demodulated to provide the correct frequency output signal.

A clearer understanding of the invention will be had with reference to the following drawings, wherein.

Figure 1:
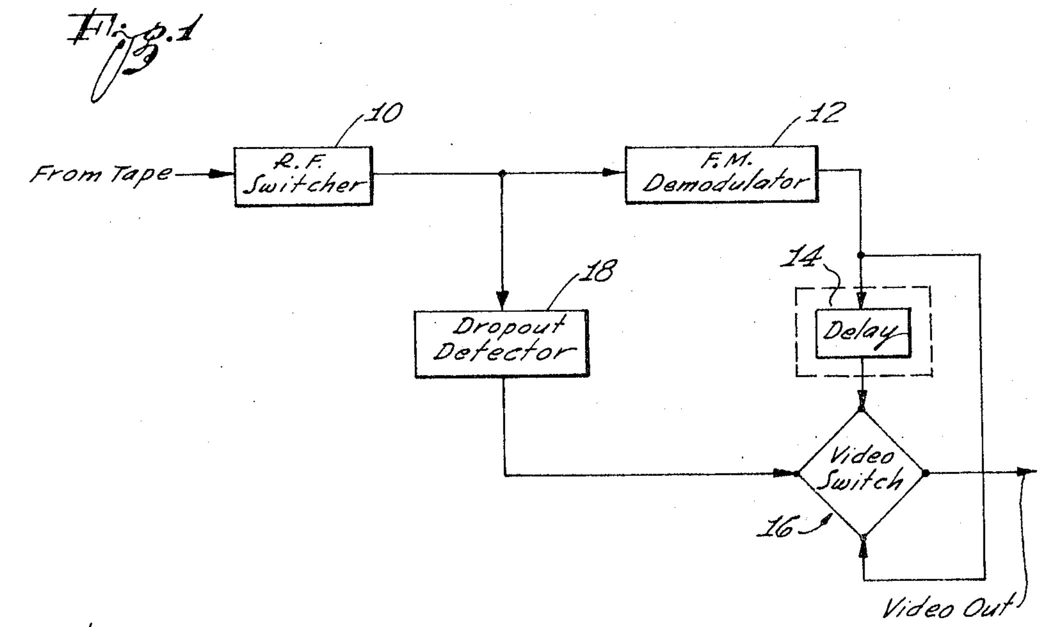
FIGURE 1 is a block diagram of a dropout compensator which provides for a compensation capability of one television line.
Figure 2:
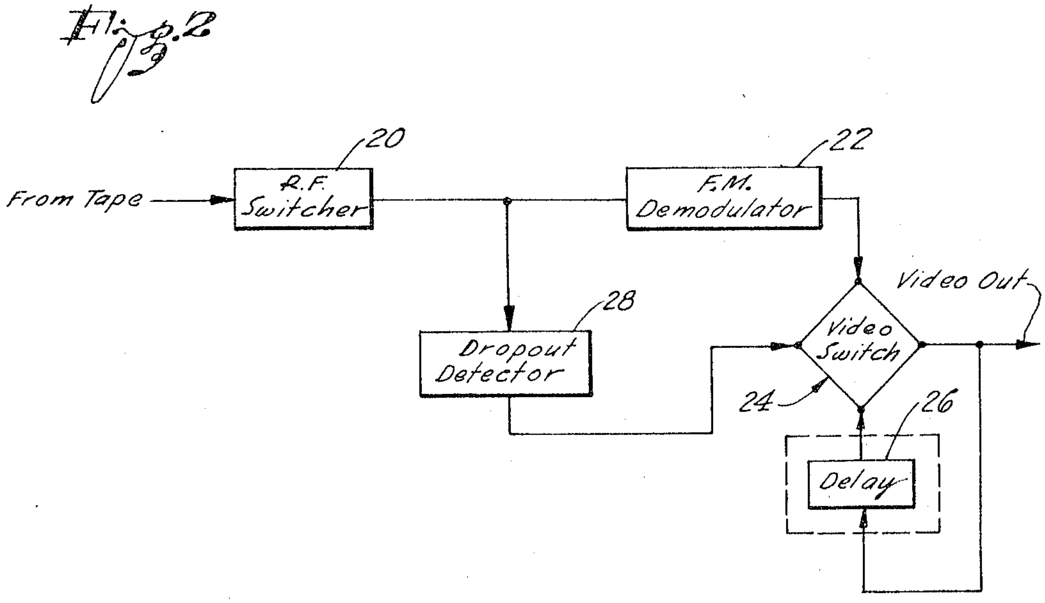
FIGURE 2 is a block diagram of a dropout compensator which is arranged to provide for an extension of the storage time so as to provide dropout compensation over many television lines.
Figure 3:
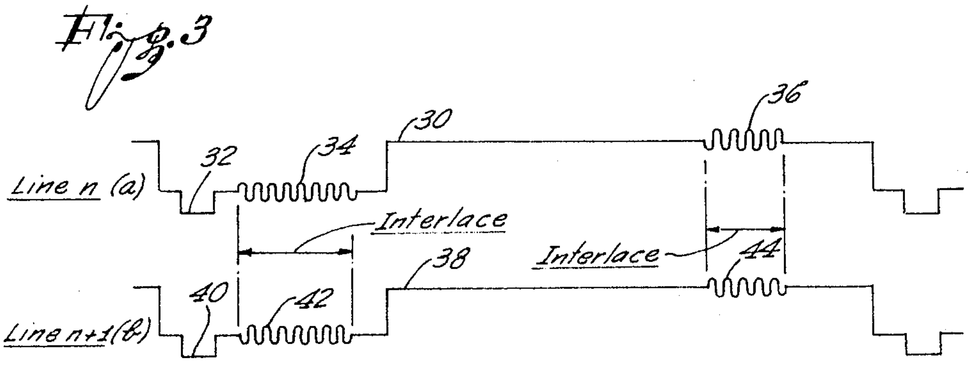
Figure 4:
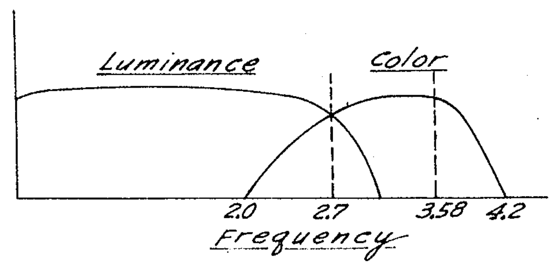
Figure 5:
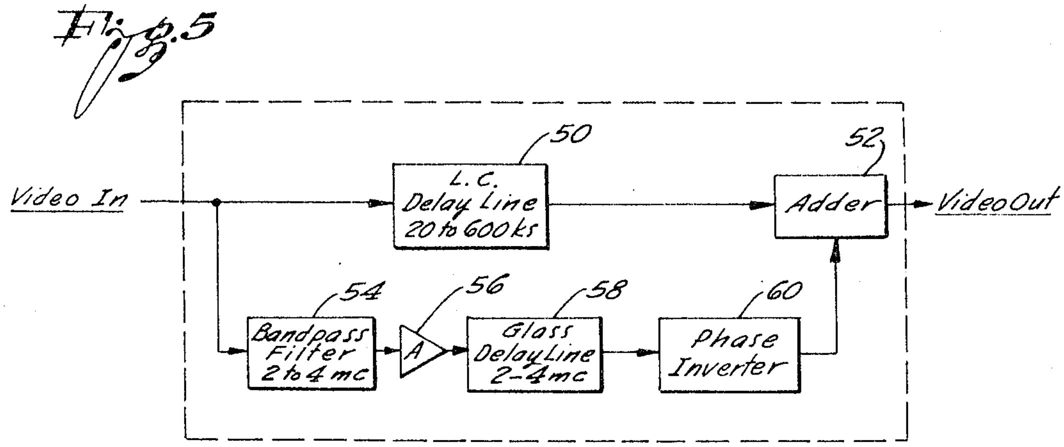
Figure 6:
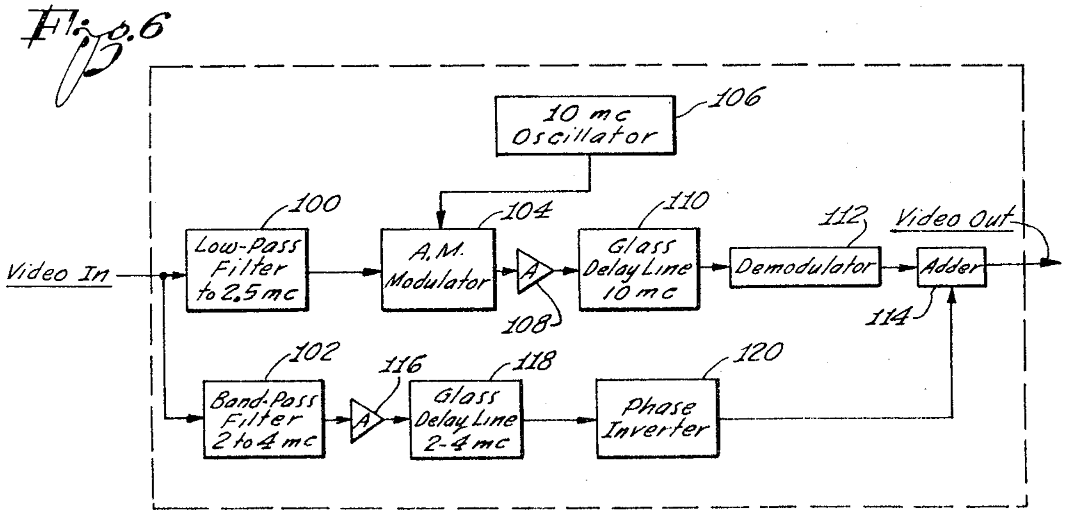
Figure 7:
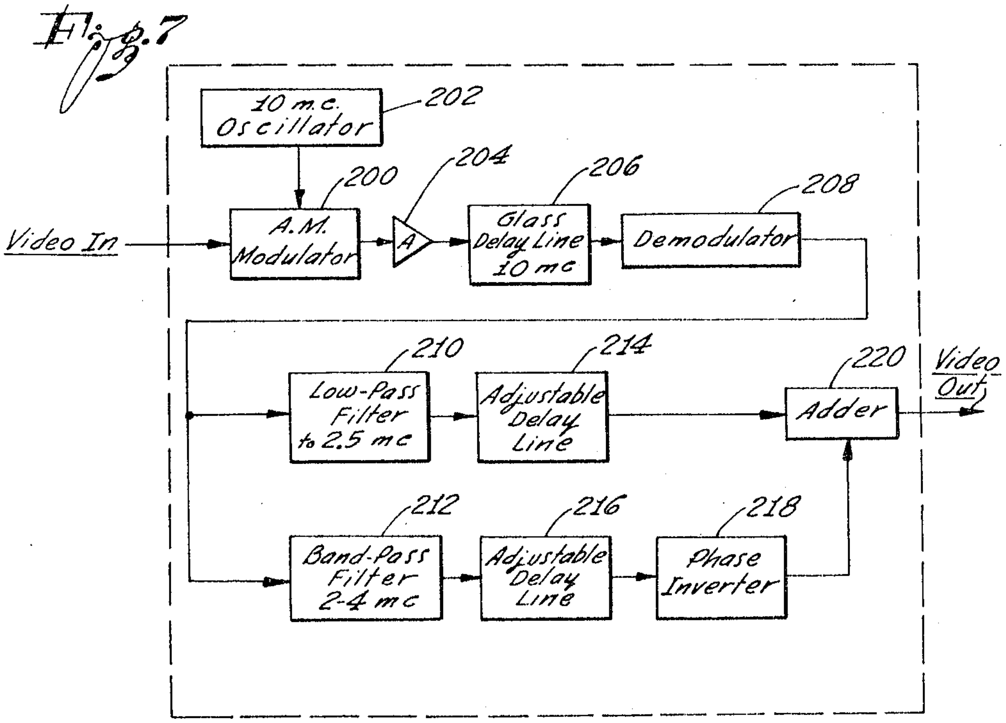

FIGURES 3(*a*) and 3(*b*) are a pair of waveforms showing the relationship of alternate lines of a color video signal;

FIGURE 4 is a curve illustrating the frequency ranges of the luminance and color portions of a color video signal;

FIGURE 5 is a first embodiment of the present invention which may be used to provide the delay portion shown in FIGURES 1 and 2;

FIGURE 6 is a second embodiment of the present invention which may be used to provide the delay portion shown in FIGURES 1 and 2; and FIGURE 7 is a third embodiment of the present invention which may be used to provide the delay portion shown in FIGURES 1 and 2.

In FIGURE 1, an RF switcher 10 reproduces the signals from a magnetic tape (not shown). The information reproduced from the tape by the RF switcher 10 is frequency modulated since magnetic video tape recorders provide for a frequency modulation of the video information so as to produce a better recording of the video information on the magnetic tape. The frequency-modulated video signals from the RF switcher 10 are then applied to a FM demodulator 12 which demodulates the frequency modulated video signals. The video signals from the FM demodulator 12 are applied to a delay means 14, shown surrounded by a dotted line, and the video signals from the FM demodulator 12 are also applied to a switch 16.

The frequency modulated video signals from the RF switcher 10 are also monitored by a dropout detector 18 which is essentially an envelope detector. The dropout detector 18 may be of a type shown in copending application Ser. No. 507,201 filed Nov. 10, 1965, by Frederick J. Hodge and Ralph R. Barclay and which is assigned to the assignee of the instant application. The dropout detector 18 provides an indication when a dropout is present in the frequency modulated video signals from the RF switcher 10. The dropout detector 18 controls the switch 16 so that when there is no dropout in the frequency modulated video signal, the video information from the FM demodulator 12 is coupled directly through the video switch 16 as the video output. When a dropout occurs in the frequency modulated video signal from the RF switcher 10, the dropout is detected by the dropout detector 18 and the dropout detector 18 controls the video switch 16 so that the video information which has been delayed by the delay means 14 is coupled through the video switch 16 as the video output.

The delay means 14 is designed to produce a delay of approximately 63.5 microseconds when the video information is a black and white signal and approximately 63.55 microseconds when the video information is a color signal. The time delay represents the time between successive scans in the video signal. It can be seen in FIGURE 1 that the output signal from the delay means 14 represents information of a preceding line in the television picture and this delayed information is substituted for the normal video information produced from the FM modulator 12 when a dropout occurs in the frequency modulated video information from the RF switcher 10. The dropout compensator of FIGURE 1 can only provide compensation over a period of time equal to a single line since the delay means 14 has a storage time of only one line of information. If a dropout occurs for a period of time greater than one line, the dropout compensator of FIGURE 1 could not provide the desired compensation.

To provide compensation for severe dropout problems which exist for periods of time greater than one line, it may be desirable to use a dropout compensator as shown in FIGURE 2. The dropout compensator as shown in FIGURE 2 provides for a storage time extension so that compensation is provided for over a period of time longer than one line of video information. The dropout compensator of FIGURE 2 includes an RF switcher 20 which reproduces the information stored on a magnetic tape (not shown). The RF switcher 20 produces a frequency modulated video signal from the tape in the same manner as the RF switcher 10 of FIGURE 1.

The frequency modulated video signal from the RF switcher 20 is applied to an FM demodulator 22. The demodulated video information from the FM demodulator 22 is applied to a video switch 24. A delay means 26, which is shown enclosed by dotted lines, is coupled between the output of the video switch 24 and a second input to the video switch 24. A dropout detector 28 is connected to the output of the RF switcher 20 to detect dropouts in the frequency modulated video signal.

The dropout detector 28 may be of the type shown in the copending Hodge and Barclay application referred to above. In the dropout compensator of FIGURE 2, the dropout detector 28 controls the operation of the switch 24. When no dropout is present in the frequency modulated video signal from the RF switcher 20, the video switch 24 is controlled to directly couple the output from the FM demodulator 22 through the video switch 24 as the video output. When the dropout detector 28 detects a dropout in the frequency modulated video signal from the RF switcher 20, the video switch 24 is controlled so that the output from the delay means 26 is coupled through the video switch to operate as the video output. Since the input to the delay means 26 is the video output, information is continuously supplied to the video switch 24 so as to provide a video output even when the dropout extends through a period of time greater than one line. The delay means 26 provide a delay of approximately 63.5 microseconds for black and white or 63.55 microseconds for color as does the delay means 14 of FIGURE 1.

The dropout compensators of FIGURES 1 and 2 provide accurate dropout compensation for black and white video information and it is not necessary to provide a wide bandpass for the delay means 14 or 26 since the viewer cannot detect the degradation in detail in the television picture over areas as small as the normal dropout. With the use of color video signals the dropout compensators of FIGURES 1 and 2 do provide some compensation for dropouts using delay means having a narrow bandpass to pass the luminance information. In other words, the prior art dropout compensators would provide some dropout compensation for color video signals through the replacement of the luminance information.

During the initial period of broadcasting of color television signals, great attention was paid to the compatible quality of the black and white picture. This is in addition to the inherent compatible nature of the present color system to black and white television receivers. For example, when a television signal representing two adjacent objects of different color is broadcasted, the owner of a color receiver would immediately perceive the difference in the adjacent objects due to the different color. The owner of a black and white receiver would have difficulty in perceiving the difference in the objects since the objects would have the same gray tone and would tend to run together.

The prior art color television tubes had limited color intensity so that it was advantageous to provide a high degree of the information directed to the viewer in the form of differences in luminance. In this manner, the owner of a black and white receiver would also receive a television picture having excellent quality. The newer television tubes, however, are capable of much greater color intensity. A television broadcaster is concerned more with quality of the color picture than the quality of the black and white picture. It is, therefore possible to have television signals providing excellent color information but poor luminance information. The black and white picture from a video signal having poor luminance information has a muddy quality due to the concentration on the quality of the color picture.

Since the television information that is broadcast may be dependent largely on color information, the use of luminance information to provide for dropout compensation becomes inadequate with color video signals. It is, therefore, desirable to provide a delay means 14 or 26 which passes a full-color video signal to the video switch for the dropout compensation.

It is not possible to merely provide for a wide bandwidth delay means to pass the color video signal since adjacent lines of color information have a reversal in phase. When the delay of the delay means is set so as to correct for the reversal in phase, a dropout in the sync pulse causes a color disturbance to the entire remaining normal line, since this would now be out of phase. When the delay is set so as to provide a proper relationship for the sync pulse, the color information is shifted 180° out of phase during any dropout compensation.

The reversal in phase of the color information may be seen with reference to FIGURES 3(*a*) and 3(*b*) wherein FIGURE 3(*a*) illustrates a color video signal 30 for line *n* which contains a sync pulse 32, a color burst 34 and one bar of color information 36. FIGURE 3(*b*) shows the adjacent line $(n+1)$ of video information 38 including a sync pulse 40, a color burst 42 and the bar of color information 44. The sync pulses 32 and 40 are in phase but the color bursts 34 and 42 for adjacent lines are interlaced so as to be 180° out of phase. In the same manner, the color bars 36 and 44 are interlaced so as to be 180° out of phase. It can be seen, therefore, that if the line of video information 30 is delayed for use as a substitute for any portion of the line of video information 38 when a dropout is detected in the line of video information 38 and if the delay of the information 30 is such that the sync pulses 32 and 40 are in phase, the color burst 34 and the bar of color information 36 would be the wrong phase in comparison to the color burst 42 and bar of color information 44. If the delay of the line of video information 30 is set so that the color burst 34 is in phase with the color burst 42 and correspondingly the bar of color information 36 is in phase with the bar of color information 44, a dropout in the sync pulse 40 would result in the dropout compensator providing a sync pulse from the line of video information 30 which cause a color disturbance to the entire remaining normal line, since the compensation sync pulse has an improper phase relationship with the remaining information. It is, therefore, desirable to provide a delayed signal for use as a dropout compensation signal which has the proper phase relationship.

FIGURE 4 shows the frequency spectrum for a color video signal and it can be seen in FIGURE 4 that the luminance information which includes the sync pulse has a frequency range which extends from zero out past 3 megacycles. The color information is contained in a passband which has frequency limits of approximately 2 and 4.2 megacycles. The crossover point of the luminance and color information is approximately 2.7 magacycles. FIGURES 5, 6 and 7 show delay means which may be used for the delay means 14 and 26 of FIGURES 1 and 2 which provide for a compensation signal usable in the dropout compensators of FIGURES 1 and 2 to provide dropout compensation for a color video signal.

In FIGURE 5 a delay means is shown which is a modification of an existing delay means normally used in dropout compensators of the prior art. The delay means of FIGURE 5 includes a delay line 50 which may be any type of delay line presently used in dropout compensators and which has a passband of 20 cycles to 600 kilocycles. The delay line 50, for example, may be of the lumped constant type of delay line, and the color video signal is applied directly to the delay line. The delay line 50 additionally operates as a low pass filter so as to cut off any signals above 600 kilocycles. The delay line 50 provides a delay of approximately 63.55 microseconds so as to delay the information for one line. The output from delay line 50 is applied to an adder 52.

The color video input to the delay means of FIGURE 5 is also applied to a bandpass filter 54 which has a passband from approximately 2 to 4 megacycles. The passband from 2 to 4 megacycles substantially covers the region of color information as shown above with reference to FIGURE 4. The output from the bandpass filter 54 is applied to an amplifier 56 which drives a glass delay line 58. The glass delay line 58 may be a conventional type which is designed to operate over the passband from approximately 2 to 4 megacycles. The glass delay lines currently available have excellent temperature characteristics and have a high degree of temperature stability.

Glass delay lines presently available cannot operate at very low frequencies but since glass delay line 58 is operated at frequencies over 2 megacycles, it is not necessary to raise the frequency of the information applied to glass delay line 58. The glass delay line 58 is also designed to provide a delay of approximately 63.55 microseconds so as to delay the color information one line. The output from the glass delay line 58 is applied to a phase inverter 60. The phase inverter provides for a reversal in phase of the color information so that the color portion of the video information is in the proper phase relationship to the next line of information presented to the delay means of FIGURE 5.

The output from the phase inverter 60 is also applied to the adder 52 to produce a video output from the adder 52, which is delayed for one line and which has the proper phase relationship to be use in a color dropout compensator. The delay means of FIGURE 5 provides for an adequate dropout compensation of color video signals but it is sometimes desirable to control the characteristics of the compensating signal from the delay means with a greater accuracy than can be achieved with the structure of FIGURE 5. For example, temperature effects may produce unequal phase shifts from the delay line 50 and the delay line 58. In addition, it is difficult to design delay lines to provide exactly the desired delay. FIGURES 6 and 7 provide for improved delay means which may be used in place of the delay means of FIGURE 5.

In FIGURE 6 the video input is applied to a low pass filter 100 and a bandpass filter 102. The low pass filter cuts off at approximately 2.5 megacycles so as to pass substantially all the luminance information including the sync pulse. The bandpass filter 102 has a passband from approximately 2 to 4 megacycles so as to pass the color information. The output signal from the low pass filter 100 is applied to an AM modulator 104 which is driven by a 10-megacycle oscillator 106 to provide amplitude modulated luminance information. The amplitude modulated luminance information from the AM modulator 104 is applied to an amplifier 108 which drives a glass delay line 110.

The glass delay line 110 is designed to operate around the 10-megacycle point so as to pass the amplitude modulated luminance information. The glass delay line 110 provides a delay of approximately 63.55 microseconds so as to delay the luminance information for one line. The output from the glass delay line is fed to a demodulator 112 which demodulates the amplitude-modulated luminance information and applies it to an adder 114. It is necessary to use the modulator 104 and the demodulator 112 since the glass delay lines currently in use are not capable of operating at low frequencies. It is desirable, however, to use such glass delay lines since they have excellent bandpass characteristics and temperature stability. The output from the demodulator 112 which is applied to the adder 114 is a delayed version of the luminance information and may be considered as a first component portion of the video output signal from the adder 114.

The second component portion of the video output from the adder 114 is from the color portion of the video input signal. As indicated above, the bandpass filter 102 passes the color information and the color information is applied to an amplifier 116 which drives a glass delay line 118. The glass delay line 118 provides for a delay of 63.55 microseconds and may be substantially the same type of delay line as the delay line 58 of FIGURE 5. The glass delay line 118 operates over a frequency from approximately 2 to 4 megacycles. It is not necessary to modulate and demodulate the color information using the glass delay line 118, as with the glass delay line 110, since the glass delay line 118 is capable of operating at frequencies from 2 to 4 megacycles.

The output from the glass delay line 118 is applied to a phase inverter 120 which reverses the phase of the color information. The color information which is now 180° out of phase is applied to the adder 114 as a second component portion for the output from the adder 114. The output from the adder 114, therefore, is a video signal which may be used as a dropout compensating signal for color television and which has the proper luminance, color and phase information for the next line in the television picture. The delay means of FIGURE 6 has increased bandwidth in the luminance portion as compared to the delay means of FIGURE 5. The embodiments of FIGURES 5 and 6 also eliminates the problem of color differential phase and gain limitations in the storage device since the color signal is treated separately from the luminance.

FIGURE 7 is a further improvement of the delay means which may be used for the delay means 14 or 26 of FIGURES 1 and 2. In FIGURE 7, the color video information is applied directly to an AM modulator 300 which is driven by a 15-megacycle oscillator 202. The color video information is amplitude modulated and applied to an amplifier 204 which drives a glass delay line 206. The glass delay line is designed to operate around 10 megacycles. The glass delay line 206 provides a delay of approximately 63.55 microseconds so as to delay the entire color video signal one line.

The output from the glass delay line is applied to a demodulator 208 which demodulates the amplitude-modulated video signal. As indicated above, it is necessary to use the modulator and demodulator with the glass delay lines since the glass delay lines currently in use are not capable of producing a delay at low frequencies. The output signal from the demodulator 208 has been delayed for one line but the color portion of the signal is not in the proper phase relationship for dropout compensation. The output signal from the demodulator 208 is accordingly applied to a low pass filter 210 and a bandpass filter 212.

The low-pass filter 210 passes frequencies below 2.5 megacycles and substantially includes all the luminance information. The bandpass filter has a pass band from 2 to 4 megacycles and substantially passes the color information. The outputs from the low-pass filter 210 and the bandpass filter 212 are respectively applied to adjustable delay lines 214 and 216. The adjustable delay lines 214 and 216 are used to provide a final compensation for errors in delay which may occur in the delay means of FIGURE 7. The use of the adjustable delay lines 214 and 216 provides for a high degree of accuracy in the delay means of FIGURE 7 but it is obvious that such adjustable delay lines may also be used with the embodiments of FIGURES 5 and 6. The output from the adjustable delay line 216 is applied to a phase inverter 218 which reverses the phase of the color information.

The output from the phase inverter is applied to an adder 220 as is the output from the adjustable delay line 214. The information applied to the adder 220 therefore is the luminance information from the adjustable delay line 214 and the phase reversed color information from the phase inverter 218. The output signal from the adder 220 therefore has an appropriate delay and phase relationship so as to be used as a color dropout compensation signal.

The delay means of FIGURE 7, therefore, provides for a dropout compensating signal which has the proper phase relationship so as to be used with color video signals. In addition, the delay means of FIGURE 7 incorporates only a single glass delay means which has a high temperature stability. In addition, the delay of both the luminance and color portions of the compensating signal are subject to further adjustable delay so as to provide for high accuracy in the compensating signal.

The present invention, therefore, provides for a color dropout compensator which may be used to compensate for dropouts in color video signals with a high degree of accuracy. Specific embodiments of the present invention provide that the compensating signal is developed by subdividing the color video signal into two channels, one representing the luminance information and one representing the color information. Both luminance and color information are delayed for a period of substantially one line of video information. The delay may be provided for either individually in each channel as shown in FIGURES 5 and 6 or the entire signal may be delayed at the same time as shown in FIGURE 7. In addition, the color information is phase reversed so as to provide for a proper phase relationship of the color information.

It is obvious that, although the present invention has been described with reference to particular embodiments, various adaptations and modifications may be made. For example, the color video signal need not be subdivided into two channels. The delay and phase reversal of the color portion of the color video signal may be accomplished in a single channel by using a phase inverter which operates through a selected range of frequencies. The invention is therefore only to be limited by the appended claims.

What is claimed is:

1. In a system for providing a dropout compensation for a demodulated color video signal by substituting a dropout compensating signal for the demodulated color video signal during the period of the dropout, a delay means including, means responsive to the demodulated color video signal for providing a first channel for the luminance portion of the demodulated color video signal and with the luminance portion of the demodulated color video signal undergoing a particular time delay, means responsive to the demodulated color video signal for providing a second channel for the color portion of the demodulated color video signal and with the color portion of the demodulated color video signal undergoing the particular time delay and undergoing a phase inversion, and means operatively coupled to the first and second channels for adding the delayed luminance portion of the demodulated color video signal to the delayed phase inverted color portion of the demodulated color video signal to produce the dropout compensating signal.

2. The delay system of claim 1 including adjustable delay means for providing a fine control for the delay of the delay system.

3. In a dropout compensator for a demodulated color video signal, a delay system for producing a dropout compensating signal, including first means responsive to the luminance portion of the demodulated color video signal for delaying the luminance portion of the demodulated color video signal one television line, second means responsive to the color portion of the demodulated color video signal for delaying the color portion of the demodulated color video signal one television line, third means operatively coupled to the second means and responsive to the delayed color portion of the demodulated color video signal for phase inverting the delayed color portion, and fourth means operatively coupled to the first means and the third means for adding the delayed luminance portion of the demodulated color video signal and the delayed phase inverted color portion of the demodulated color video signal to produce a dropout compensating signal.

4. The delay system of claim 3 wherein the second means includes a bandpass filter for passing the color portion of the demodulated color video signal and a glass delay line for delaying the color portion of the demodulated color video signal.

5. The delay system of claim 3 wherein the first means includes a low pass filter for passing the luminance portion of the demodulated color video signal and a glass delay line for delaying the luminance portion of the demodulated color video signal.

6. The delay system of claim 3 wherein the first and second means are separate color delay means and are used to eliminate differential phase and gain limitations of the delayed color video.

7. In a dropout compensator for a color video signal, a delay system for producing a dropout compensating signal, including, a low pass filter responsive to the color video signal for passing the luminance portion of the color video signal, a modulator operatively coupled to the low pass filter for modulating the luminance portion of the color video signal at a frequency higher than the upper frequency limit of the low pass filter, a delay line operatively coupled to the modulator for delaying the modulated luminance portion of the color video signal a period of time substantially equal to one television line, a demodulator operatively coupled to the delay line for demodulating the delayed modulated luminance portion of the color video signal to produce a delayed luminance portion of the color video signal, first means operatively coupled to the color portion of the video signal for delaying for a period of time substantially equal to one television line and for phase inverting the color portion of the color video signal, and means operatively coupled to the demodulator and to the first means for adding the delayed luminance portion of the color video signal and the delayed phase inverted color portion of the color video signal.

8. The delay system of claim 7 wherein the delay line is a glass delay line.

9. The delay system of claim 7 wherein the first means includes a glass delay line.

10. In a dropout compensator for a demodulated color video signal, a delay system for producing a dropout compensating signal, including means responsive to the demodulated color video signal for delaying the demodulated color video signal a period of time substantially equal to one television scan line, and means for phase inverting the color portion of the demodulated color video signal.

11. In a dropout compensator for a demodulated color video signal, a delay system including first means responsive to the demodulated color video signal for delaying the demodulated color video signal a period of time substantially equal to one television line, second means operatively coupled to the first means for passing the luminance portion of the delayed demodulated color video signal, third means operatively coupled to the first means for passing and phase inverting the color portion of the delayed demodulated color video signal, and fourth means operatively coupled to the second and third means for adding the luminance and phase inverted color portions of the delayed demodulated color video signal.

12. The delay system of claim 11 wherein the first means includes a glass delay line.

13. The delay system of claim 11 wherein the first means includes a modulator for modulating the demodulated color video signal, a glass delay line and a demodulator for demodulating the delayed color video signal.

14. The delay system of claim 11 additionally including adjustable delay lines operatively coupled to the second and third means to provide a fine control of the delay of the delay system.

References Cited

UNITED STATES PATENTS

| | | | |
|---|---|---|---|
| 2,736,859 | 2/1956 | Pritchard et al. | 178—5.4 XR |
| 2,996,576 | 8/1961 | Dolby. | |
| 3,141,926 | 7/1964 | Newell | 178—5.4 |
| 3,366,732 | 1/1968 | Holmberg. | |

RICHARD MURRAY, Primary Examiner

U.S. Cl. X.R.

178—5.4, 6.6